United States Patent
Vicik et al.

[19]

[11] Patent Number: 5,835,904
[45] Date of Patent: Nov. 10, 1998

[54] SYSTEM AND METHOD FOR IMPLEMENTING DATABASE CURSORS IN A CLIENT/SERVER ENVIRONMENT

[75] Inventors: Frederic O. Vicik, Issaquah; Lale R. Divringi, Bellevue, both of Wash.

[73] Assignee: Microsoft Corporation, Redmond, Wash.

[21] Appl. No.: 838,610

[22] Filed: Apr. 10, 1997

Related U.S. Application Data

[63] Continuation of Ser. No. 550,691, Oct. 31, 1995, abandoned.
[51] Int. Cl.⁶ .................................................. G06F 17/30
[52] U.S. Cl. ............................... 707/1; 707/8; 707/10; 395/200.33
[58] Field of Search ................. 707/1, 8, 10; 395/200.33

[56] References Cited

U.S. PATENT DOCUMENTS

| | | | |
|---|---|---|---|
| 5,202,981 | 4/1993 | Shackelford | 395/601 |
| 5,339,388 | 8/1994 | Bates et al. | 395/331 |
| 5,446,858 | 8/1995 | Copeland et al. | 395/427 |
| 5,692,178 | 11/1997 | Shaughnessy | 707/8 |
| 5,706,505 | 1/1998 | Fraley et al. | 707/103 |

OTHER PUBLICATIONS

Stonebraker and Rowe, "Database Portals: A New Application Program Interface," Proceedings of Tenth International Conference On Very Large Data Bases, Aug., 1984.
Gupta Technologies, Menlo Park, CA, "SQLBase Technical Reference Manual, Version 3.4," Apr. 1, 1988.
Date, C.J., "An Introduction To Database Systems," Sixth Edition, 1995, pp. 243–252 and pp. 389–410.

*Primary Examiner*—Paul V. Kulik
*Attorney, Agent, or Firm*—Leydig, Voit & Mayer, Ltd.

[57] ABSTRACT

A system and method for implementing database cursors at the server in a client/server environment is disclosed. In operation, the system and method for implementing the database cursors is compatible with existing client/server database search engines but provides for increased control over cursor lock options, an ability to share cursors and search plans across multiple nodes in a network, and an increase in the overall operating efficiency of a database application. The invention is directed to cursors for all types of collections or compilations of data in a client/server database environment.

3 Claims, 7 Drawing Sheets

| Change Description | Static Serial. Only | Dynamic Read Com. | Dynamic Serial. | Keyset Read Com. | Keyset Serial. |
|---|---|---|---|---|---|
| Cursor Owner's Update Operations | Not Visible | Visible | Visible | Visible | Visible |
| Cursor Owner's Delete Operations | Not Visible | Visible | Visible | Visible | Visible |
| Cursor Owner's Insert Operations | Not Visible | Visible | Visible | Visible | Visible |
| Non-Cursor Owner's Update Operations | Not Visible | Visible | Not Visible | Visible | Not Visible |
| Non-Cursor Owner's Delete Operations | Not Visible | Visible | Not Visible | Not Visible | Not Visible |
| Non-Cursor Owner's Insert Operations | Not Visible | Visible | Visible | Not Visible | Not Visible |
| Cursor Owner's Direct Effect Updates On Data | Not Visible | Visible | Visible | Not Visible | Not Visible |
| Cursor Owner's Indirect Effect Updates On Data | Not Visible | Visible | Not Visible | Not Visible | Not Visible |
| Non-Cursor Owner's Direct Effect Updates On Data | Not Visible | Visible | Not Visible | Not Visible | Not Visible |
| Non-Cursor Owner's Indirect Effect Updates On Data | Not Visible | Visible | Not Visible | Not Visible | Not Visible |

FIG. 4

CURSOR STRUCTURE

FIG. 6

```c
typedef struct cursor {
    char    crs_name [MAXNAME + 1];  // cursor name (if any);
    BYTE    crs_nlen;                // Length of cursor name
    short   crs_scrollopt;           // Scroll option
    short   crs_compileccopt;        // Compile time concurrency option
    short   crs_nviews;              // Number of views involved int he cursor
    short   crs_ntables;             // Number of tables involved in the cursor
    struct  crstabl *crs_table;      // Pointer to table structure
    struct  proc_hdr *crs_phdr;      // Statement execution plan header
    struct  e_stmt *crs_phdrstep;    // E_STMT for the first statement
    struct  seqframe *crs_seqframe;  // Eptr to sequence frame
    struct  e_stmt *crs_estmt;       // E_STMT for the cursor select statement
    struct  tree *crs_root;          // ROOT for the select statement
                                     // Used only by browse to detect UNIONs
    struct  e_stmt *crs_fetchstmt;   // E_STMT for the fetch statement
    struct  viwtabl *crs_view;       // Pointer to array of views (if any)
    struct  tree *crs_updcols:       // Resdoms of FOR UPDATE...columns
    long    crs_jcost;               // Estimated cost of query
    int     crs_selmaxsize;          // Maximum size of row format sent to client
    long    crs_openstat;            // Cursor open status (Modified runtime later)
    BYTE    *crs_textptrmap;         // Bitmap showing TEXTPTR only resdoms
    struct  crsdynrow *crs_dynrows;  // Array of buffered rows during dynamic back scan
    struct  crsparam *crs_params:    // Values of P_hdrvars at the time of declare cursor
    int     crs_stat;                // Cursor status
    struct  cursor *crs_next;        // ptr to next cursor structure
    int     crs_totrows;             // Total number of rows in results set (if known)
    struct  proc_hdr *crs_spphdr;    // Stored procedure proc hdr
    int     crs_nrow;                // Current row number (relative to start)
    int     crs_nfetch;              // Start of fetch row number
    int     crs_totfetch;            // Total no. of rows fetched
    int     crs_newfetch;            // Start of new fetch request
    int     crs_newtotfetch;         // No. of rows requested to be fetched
    struct  strmbuf *crs_precvbuf;   // Save receive buffer for parser
    struct  crsdynrow *crs_curdynrow;// Current row being buffered. Row buffers are
                                     // allocated on an as needed basis
    short   crs_nmaxeop;             // Max. no. of coporder in tables
    BYTE    crs_isolevel;            // Isolation level during cursoropen
    BYTE    crs_savisolevel;         // Current isolation level of pss
    short   crs_ccopt;               // Run time concurrency option
    short   crs_sparel;              // For proper alignment
    int     crs_relskip;             // Skip amount in dynamic RELATIVE
    int     crs_setpos;              // Current row number via SETPOSITION
    LOCKHEAD crs_scrollock;          // Locks held during fetch
    LOCKHEAD crs_holdlock;           // Locks held throughout cursor closure
    LOCKHEAD crs_oldlocks;           // Locks held from previous fetch
    long    crs_spinlock;            // Spinlock for cursor
    int     crs_fetchorder;          // Order of resdoms during fetch
    int     crs_fetchwait;           // Parent waiting this row to be added to keyset
    int     crs_runstat;             // Run time status
} CURSOR;
```

FIG. 7 CURSOR TABLE STRUCTURE

```c
typedef struct crstabl {
    struct   crstabl *ct_next;       // Pointer of next table
    struct   range *ct_range;        // Pointer to VRANGE structure
    short    ct_nresdoms;            // No of resdoms selected from this table
    short    ct_nkeys;               // No of keys in its unique index
    short    ct_indid;               // id of unique index used
    short    ct_tsid;                // Index of timestamp
    short    *ct_offset;             // Offset of columns in the keyset row
    short    *ct_taboff;             // Offset of columns in the corresponding table
    BYTE     *ct_keycollen;          // Max column size of each keyset column
    struct   tree **ct_resdoms;      // Pointers to unique key & its resdoms
                                     // Last resdom is timestamp if any
    struct   tree **ct_fetchres;     // Resdoms in the fetch plan
    BYTE     *ct_resorder;           // Ordering of the resdoms in the select list
    short    *ct_keyorder;           // Ordering of index keys
    char     *ct_optccrow;           // Ptr to optccval row
    short    ct_nbuiltins;           // Number of col's participated in built-in functions
                                     // after browse, no of subst in eop->subst list
    short    ct_keysetminlen;        // Minimum length of keyset row
    long     ct_stat;                // Status (has timestamp, etc...)
             // End of fields to be reused, the fields above should
             // match those of the subcrstabl structure below
    SDES     *ct_sdes;               // SDES for the table
    struct   sarg *ct_sargs;         // Pointer to keyset search args
    SDES     *ct_wrksdes;            // SDES for the keyset worktable
    struct   index *ct_wkdestxindex; // Text index for the workdes
    char     *ct_keysetrow;          // Row template for keyset based fetch
    short    ct_dynsargcnt;          // Search argument count for a dynamic index
                                     // Also serves as a select # in a union
    short    ct_dyneoporder;         // Order of appearance of this eop
    struct   sarg *ct_dynsargs;      // Search arguments for a dynamic fetch
    struct   e_op *ct_dyneop;        // E_OP corresponding to this table
    struct   sarg *ct_eopsarg;       // Original SARGs for the E_OP
    char     *ct_dynfetchrow;        // Ptr to keyset values for dynamic fetch
    struct   sdes *ct_optccsdes;     // SDES for the optccval table
    SDES     *ct_awrksdes;           // SDES for async keyset generator
    char     *ct_inskeysetrow;       // Row template for keyset inserts
} CRSTABL;
```

SYSTEM AND METHOD FOR IMPLEMENTING DATABASE CURSORS IN A CLIENT/SERVER ENVIRONMENT

This is a continuation of application Ser. No. 08/550,691 filed on Oct. 31, 1995 now abandoned.

FIELD OF THE INVENTION

The present invention relates generally to a system and method for implementing database cursors in a client/server database environment. More particularly, the present invention relates to a system and method for implementing such database cursors at the server.

BACKGROUND OF THE INVENTION

Many database applications and databases are implemented in client/server environments. Generally, a client/server environment is a distributed computing environment in which information and resources that are stored on or controlled by certain computing machines, known as servers, are made accessible to other computing machines, known as clients. Server machines in client/server environments also implement applications that are shared by multiple clients. It is commonly accepted that the client/server arrangement of sharing data and applications reduces redundancy and generally increases system efficiency. However, machines that are "servers" for one application may also be "clients" for other applications or services that are available on the network. Thus, terms such as server and client typically have meaning in the context of a particular application or situation.

Clients and servers are generally interconnected in a networked configuration such as a local area network (LAN), a wide area network (WAN) or any other system of interconnections which is capable of exchanging data between two or more computing machines. The servers, clients, and other equipment that are linked to the network are known as "nodes." Nodes communicate over the LAN or other network by using protocols and standards that are understood and in use by other nodes on that network. A client/server database environment generally includes at least one server, several clients communicating over a network, a database or a collection of data located at the server, a database management system ("DBMS") that operates with a known database language such as the Structured Query Language (SQL), and applications located at clients that access the DBMS and database via the network.

Particularly in client/server database systems, it is an important responsibility for the DBMS to provide a means for searching a server-resident database for specific data requested by client-resident applications. The DBMS is also responsible for providing the results of any query back to the requesting client. The query process is generally comprised of the following steps. First, a client based application requests a search of the database. Second, the DBMS, through the use of a "search engine," custom builds a search plan according to the request. Third, the search engine executes a search of the database according to the plan and generates the results of the query in a separate data structure known as a result set. Finally, the result set is communicated to the requesting client.

The result set based on a client's query may exist in various forms. For example, the result set may be a physical copy of the data in the database or it may be a separate data structure comprised of pointers to data in the database. In whatever form, the result set is a set of data from the database which satisfies the search criteria of the client-initiated query. It is this result set that must be communicated to the client that initiated the query.

Sets of data, such as the above mentioned result set, are different from standard data records or rows of data. Generally, access to a set of data does not necessarily guarantee access to individual records or rows that comprise the set of data. "Set oriented" database systems or database systems that are designed only to operate on sets of data are widespread. For example, relational database systems, such as ANSI based SQL products, are set oriented. This means that these database systems can only operate on sets of data and do not specifically operate on single quanta, such as rows, of data. Thus, in typical relational database systems, there is no mechanism to operate on a single row of a database or to access a "next" row or a "previous" row of that database. This presents a significant problem in database applications because most users and most client applications require access to specific rows.

To remedy this problem, it is known in the art to utilize a data structure called a "database cursor" which establishes a known position within a set, such as a result set. A database cursor is a data structure which represents a specific position within a result set and permits rows to be processed one at a time in a fashion similar to processing consecutive records in a standard data structure. The data structure is called a cursor because it indicates an insertion or modification position within a set. In this sense, a database cursor is similar to a word processing screen cursor that graphically indicates the position of an insertion point in a document.

Database cursors are used for many functions. The most common use of database cursors is to facilitate modification to the data that is indicated by the database cursor. However, many other applications of cursors exist. For example, cursors are commonly used to set "lock conditions", i.e. to control access to certain data. For example, cursors may control access to data that has been indicated by the cursor of a single client. Cursors are also commonly used to control data scrolling between server and client.

Currently, database cursors may be created or maintained by the client at the time that a query is requested by a client application. When the client application queries the database, the client application builds a cursor data structure or table that is commensurate with an expected result set. In this way, the client maintains the cursor which contains information about the client's own position within the result set of returned data. Implementing cursors at the client permits client applications to set data isolation (data locking) and concurrency levels within a database. The term "concurrency" refers to the ability of a database system to timely permit and reflect changes to the database whereas the term "data isolation" refers to the ability of a database system to inhibit various clients from changing data in the database. Generally, a higher degree of concurrency of a system correlates to a lower degree of data isolation and vice-versa.

The ability to select the level of concurrency or data isolation is important in a client/server database environment because many clients are able to access and modify a single database. As a result of this open access, it may be possible for one client to modify data while another client is viewing or attempting to modify the same data. Thus, depending on individual client application needs, a higher degree of data isolation with a resultant lower degree of concurrency may be desired or vice-versa.

By locating database cursors at the client, a client may set database concurrency and data isolation, or serializability, levels to generally two levels. The first level, known as Read Repeatability or Repeatable Read ("RR"), guarantees that the first client to access data will be the only client to control modifications to this data for as long as this client holds a lock. In this context, the data is considered to be serializable since other clients in the system can not access and modify the data until the first client releases the lock. RR or serializable isolation is generally considered to be the highest degree of data isolation.

The RR level of data isolation, however, is generally too rigid for those client applications that require access to quickly changing data or to absolutely current data. For these applications, a client application may specify a lower level of data isolation along with the corresponding higher level of concurrency. This second level of isolation is known as Cursor Stability ("CS") or Read Committed ("RC"). In contrast to RR, CS only guarantees that an individual row indicated by the cursor will be isolated. Thus, the client only locks one row at a time while other clients may access and modify other data rows.

The client-based cursor systems described above can set the isolation level to either RR or CS by issuing fictional updates to data indicated by the cursor. For many database products, such as Microsoft's® SQL Server (Ver. 4.2), when a client issues a command to update data, the system temporarily locks the data from all other modifications until the client issues a "commit" instruction which actually modifies the data. Thus, by issuing an update and by withholding a commit, the client may temporarily lock the data from all other users.

A final data isolation level also known in the art and implemented in some database systems is the optimistic lock. For the optimistic lock, the client allows changes to the underlying data and does not attempt to issue any fictional updates. If and when the client application needs to change data or to verify whether any data was changed, the client checks a time stamp or other value. If the time stamp or other value indicates that the last change to the data was prior in time to the client's first request regarding the data, the client may change the data without problem. However, if the time stamp indicates that the data has been changed since the client's first request, the client must re-request the data from the database before any modification can occur or before the data can be verified.

Client based cursors, however, do not solve all individual data row access problems in a client/server environment. For example, client based cursors generally only provide data isolation of RR/CS. That is, client-based cursors do not provide for control over data isolation that varies from the basic RR/CS isolation scheme. Moreover, implementing client-based cursors requires significant overhead in terms of additional communication over the network between server and client. In busy network environments, client-based cursors can unnecessarily reduce available bandwidth. In addition, client-based cursors are typically slow because they are updated over the network and because updates to client based cursors must wait until they are acknowledged and acted upon by a remote server.

OBJECTS AND SUMMARY OF THE INVENTION

It is therefore the general object of the present invention to provide an improved system and method for providing cursors at a server in a client/server database environment.

It is a further object of the invention to provide a system and method for providing cursors in a client/server database environment that reduce network communications.

A related object of the invention is to provide a system and method for providing cursors in a client/server database environment that permit increased control over data concurrency and data isolation levels.

It is a further object of the invention to provide a system and method for providing cursors in a client/server database environment that can operate without significant modification to existing protocols.

Briefly, the invention provides a novel system and method for implementing database cursors in a distributed computing client/server environment. The inventive system and method implements database cursors at the server and utilizes existing protocol stacks and client applications. The inventive system also provides for client-based cursor implementations if the destination server does not implement cursors. The system and method of the invention further implements a novel data locking scheme. The system and method increases the speed and efficiency of the implementation of database cursors and also provides additional advantages over the prior art such as the ability to begin transmitting a result set to a client before the result set is fully populated.

Thus, the system and method for implementing the database cursors is compatible with existing client/server database search engines but provides for increased control over cursor lock options, an ability to share cursors and search plans across multiple nodes in a network, and an increase in the overall operating efficiency of a database application. The invention is directed to cursors for all types of collections or compilations of data in a client/server database environment.

Further advantages and aspects of the invention are set forth in the detailed description below.

BRIEF DESCRIPTION OF THE DRAWINGS

FIG. 4 is a table that graphically sets forth the concurrency, lock options and their effect on the cursor owner for database cursors implemented at the server in accordance with a preferred embodiment of the invention.

FIG. 6 shows the type definitions for the parameters of the cursor structure suitable for use in a preferred embodiment of the invention.

FIG. 7 shows the type definitions for the parameters of the cursor table structure suitable for use in a preferred embodiment of the invention.

DETAILED DESCRIPTION OF THE PREFERRED EMBODIMENT

Turning now to the illustrations, a preferred embodiment of an apparatus according to the invention is shown in the figures and described below.

Figure 1:
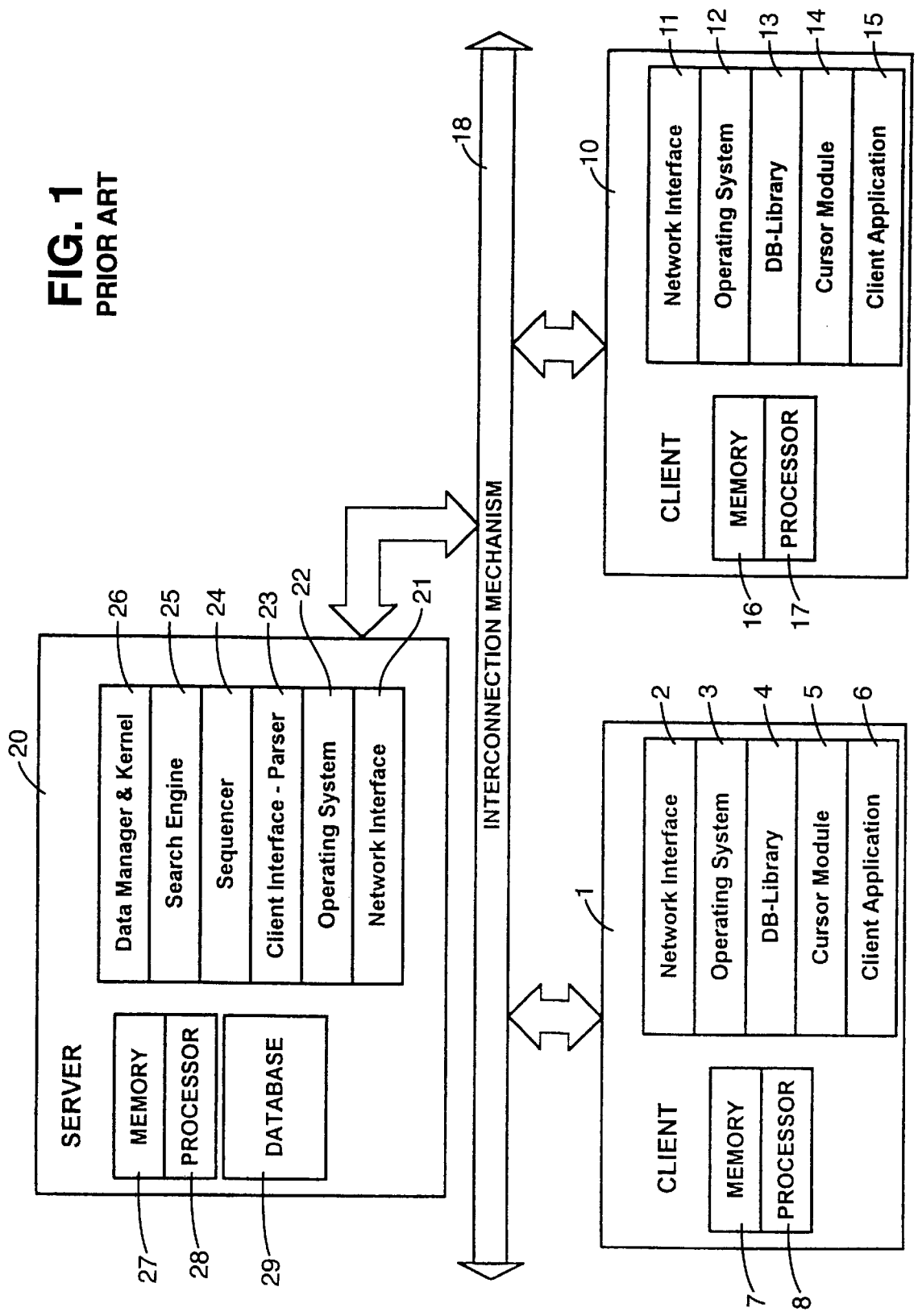
FIG. 1 is a diagram of the prior art showing the components of a typical client based cursor implementation in a client/server database environment including a database cursor control system located at the client.

Referring to FIG. 1, therein is shown the components of a typical client/server database environment as known in the art. In FIG. 1, an interconnection mechanism 18, such as a local area network ("LAN") bus, connects clients 1 and 10 and their associated components with a database server 20 and its associated components. FIG. 1 graphically illustrates the portions of client 1 that are used to implement database cursors as taught by the prior art in a particular type of database system known as an SQL Server system. More specifically, client 1 includes a processor 8, at least one memory 7, a network interface 2, an operating system 3, a DB-Library 4, a cursor module 5, and a client application 6. These components are further explained below.

The network interface 2 of client 1 includes a number of components (not shown) which permit client 1 to interface to the local area network and, ultimately; to communicate with the server 20. For example, the network interface includes a network interface card ("NIC") which permits a physical connection to the LAN as well as several network or transport protocol stacks that create the data packets that are ultimately transmitted onto the network via the NIC. Thus, the module schematically illustrated as network interface 2 of client 1 is responsible for controlling communications between client 1 and the network.

The operating system 3 of client 1 is a standard component in workstations. The operating system is, among other things, the means by which a client reads and writes data from or to a storage medium, thereby controlling the local storage activities of the client.

The DB-Library 4 of client 1 is an integral part of the SQL Server based system. Among other things, the DB-Library 4 is an interface that connects a client's database application with a client's operating system. The DB-Library 4 also includes many data structures and processes that facilitate operation of higher level functions, i.e. user level functions, with lower lever functions, i.e. disk storage.

The cursor module 5 of client 1 implements cursors at the client as described above. This portion of the client 1 is responsible for maintaining the position of the client application within a result set of a database. Finally, client application 6 of client 1 is the component that queries and updates the SQL Server and its associated database at the highest logical level.

Client 10 of FIG. 1 is illustrated to show an additional client on a single network. Thus, components 11–17 of client 10 are similar in function, though not necessarily identical, to components 2–8 of client 1. For simplicity, additional clients are not shown. However, the ability of prior art systems and the present database system to administer multiple clients, such as clients 1 and 10, is noteworthy. Without multiple clients (or multiple applications) accessing the same database, there would be little need to implement data isolation or concurrency schemes, and the full advantages of client/server computing would not be realized.

Server 20 of FIG. 1 is the physical and/or logical location for the database and for the prior art SQL Server DBMS. Server 20 includes several components which are used to complete a client/server database environment. Server 20 includes at least one processor 28, at least one memory means 27, a database 29, a network interface 21, an operating system 22, a client interface parser 23, a sequencer 24, a search engine 25, and a data manager 26.

Network interface 21 and operating system 22 of server 20 are similar to components 2 and 3 in client 1. These components ensure data communication over the network between the sever and other nodes on the network. Components 23–26 are the components which are specific to the basic SQL Server. The server's client interface parser 23 is responsible for accepting data packets from clients on the network via the network interface 21 and operating system 22. In operation, client interface parser 23 accepts a data packet from the operating system, parses the data packet, assigns object references and arguments and transmits client instructions or data to the sequencer 24. Client interface parser 23 is also responsible for recognizing and parsing any remote procedure calls ("RPC") issued by a client.

RPCs are capable of invoking processes at a server at the request of a client. The process invoked at the server is predefined and follows a set of steps defined by the SQL Server. For example, an RPC may be a predefined query that is similar to other client queries and, therefore, follows the same steps as the query process. However, there are differences between RPCs and client-generated queries. RPC queries are fully optimized before invocation and are ready for execution by a client. Moreover, RPCs can accept and return parameters and status values and have the ability to incorporate other RPC-type processes.

After the client interface parser 23 has interpreted and parsed a client packet, it passes an instruction to the sequencer 24. As its name implies, the sequencer 24 invokes other components, such as the search engine 25 and data manager 26, in a proper sequence depending on the request made to the client.

Search engine 25, also known as a query processor, includes two sub-components (not shown). The first sub-component is a query optimizer which selects an optimum process for searching the database. This process of optimizing the query is used because the client does not provide information on how to accomplish the search. The result of the optimization process is known as an execution plan. The second sub-component of search engine 25 executes the execution plan. This module receives the optimized execution plan and interacts with the data manager and kernel 26 to execute the plan.

Data manager and kernel 26 are the components responsible for direct access to the database on the server. These components are also responsible for low level functions usually associated with operating systems such as input and output operations and data buffer operations. These components accept instructions from the search engine to ultimately process the client query.

With the foregoing explanation of individual components, an overall description of a typical operation of the system of FIG. 1 is possible. In such an operation, client application 6, usually as part of a query operation initiated by a user, requests a database cursor. To accomplish this, client application 6 transmits the request to cursor module which builds a data structure in the memory of client 1. Thereafter, through the use of the DB-Library 4, operating system 3, network interface 2, and the interconnection mechanism 18, the client transmits the query to server 20. Server 20, through the use of its network interface 21 and operating system 22 receives the query and, through its client interface parser 23, begins the process of selecting data for the result set. The sequencer 24, search engine 25 and data manager and kernel 26 will then populate or fill in the result set.

Once the result set is fully populated with the data that complies with the client's query, server 20 transmits a first segment of data over the network to client 1. Because some result sets are large, server 20, through client interface 23, will transmit only a limited fixed amount of data to client 1. Thereafter, client 1 receives this first segment and cursor module 5 updates the data structure that it previously generated to reflect a current row position of client application 6 within the transmitted segment. As client application 6 moves through the segment transmitted by server 20, cursor module 5 continually updates the client's current position. If client application 6 attempts to move beyond the range of the transmitted segment, cursor module 5 transmits a request for additional data via the network and network interface. In this manner, client application 6 can move through a complete result set even though only segments of the result set are transmitted at any given moment.

This process of a client moving through a result set is known in the art as "scrolling." In the prior art client implemented cursor systems, a client only had a limited ability to scroll through the result set. Moreover, the client lock setting on data within a result set also affected the ability of that client or other clients to scroll through or update rows in this result set, particularly in cases where this result set spanned multiple tables. A result set that spans multiple tables is known in the art as a joined table, or, more simply, as a "join." As discussed below, the invention provides a superior and more efficient mechanism, over those known in the art, for improving cursor dependent operations such as scrolling, updating, and joining.

Figure 2:
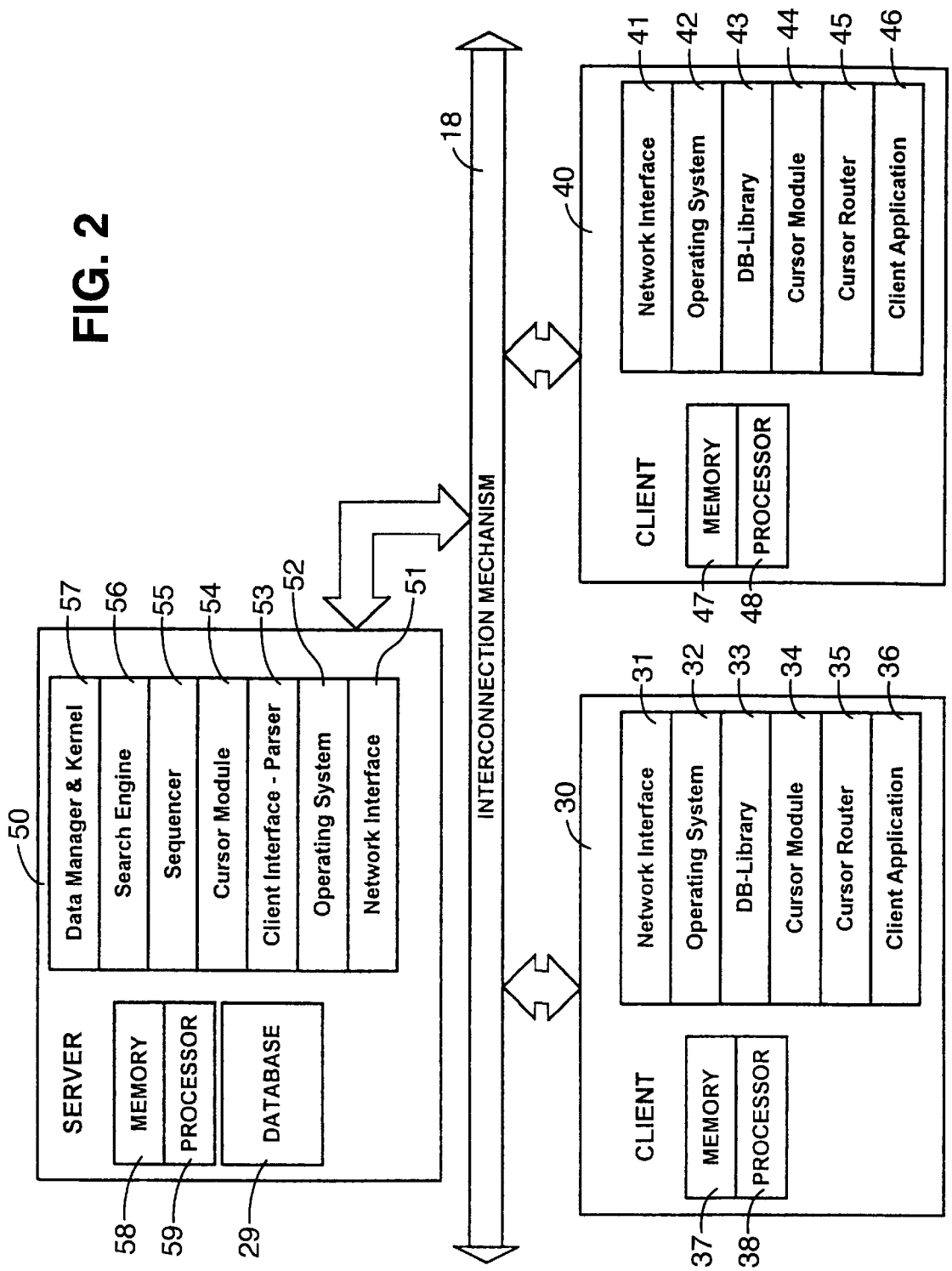
FIG. 2 is a diagram of a preferred embodiment of the invention which provides for the implementation of cursors at the server.

Turning to FIG. 2, a preferred embodiment of the present invention is illustrated. The inventive system of FIG. 2 includes a novel implementation of cursors with an associated novel implementation of a data isolation/concurrency scheme that may be accomplished within a pre-existing SQL Server environment. As is readily apparent from a comparison of FIG. 2 with FIG. 1, similar components are present in both figures. In general, corresponding components in FIG. 2 function similarly to those shown in FIG. 1 and described earlier.

The system of FIG. 2 accomplishes a novel implementation of database cursors by modifying both clients and servers and by utilizing the existing capabilities of the known components of FIG. 1. At a modified client, such as client 30, a system and process to intercept and route cursor requests from the cursor application are added. This system and process are graphically illustrated as cursor router 35. At the modified server, server 50, a system and process to implement database cursors at the server and to implement a novel locking scheme are shown. This system and process are graphically illustrated as cursor module 54.

In operation, cursor router 35 receives requests from a client application to open a database cursor and routes the cursor request to either cursor module 34 located on the client or, via the network interface and network, to cursor module 54 located on the server 50. Router 35 routes the cursor request depending on whether cursor module 54 has been implemented at the server 50. Client 30 determines whether cursor module 54 has been implemented at server 50 by querying server 50 via the network. Upon receiving the query, server 50 transmits a data packet back to client 30 which indicates this status. If client 30 and, hence, router 35 receive a status that indicates the presence of a cursor module, router 35 routes the database cursor request directly to network interface 31 which, in turn, routes the cursor request to the server. Conversely, if the status indicates that the server does not have cursor module 54, router 35 routes the database cursor request to the client cursor module 34.

Cursor router 35 is a novel component of client 30 that permits the client to maintain existing database relationships with servers that do not implement cursors at the server. As noted above, a network may include multiple servers and it is therefore possible that some servers may not include a cursor module such as cursor module 54. If a server does not have the necessary cursor module to implement database cursors, the client can not successfully transfer cursor responsibility to the server. In this case, the modified client assumes cursor responsibility.

Although only two clients are illustrated schematically in FIG. 2, it is implicit that a larger number of clients may be supported on a given local area network. Additionally, it is noted that although only one server is illustrated, the invention is not limited to one server. Rather, depending on the applications, many servers may be employed. Indeed, for some applications, clients may be configured as servers and vice-versa. Finally, it is noted that any appropriate network configuration may be employed in the invention including configurations such as Token Rings® or Ethernet®. Thus, the invention is not limited to a specific type and orientation of a network or to the number of clients, servers or other devices that are on the network.

Figure 3:
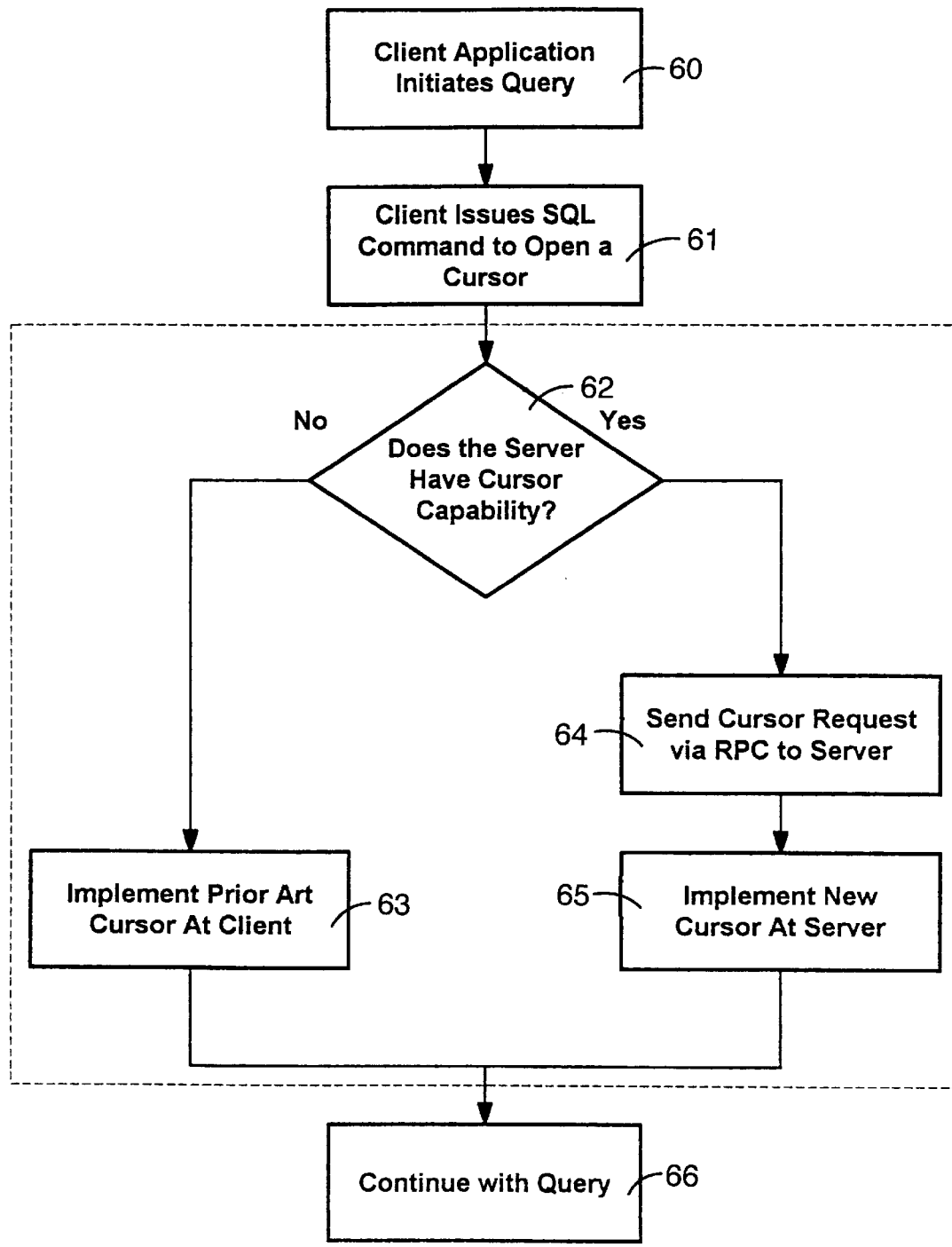
FIG. 3 is a flowchart showing the steps taken by the client router component of the invention to implement database cursors at the server while maintaining an existing client on the database system.

The process implemented by cursor router 35 is illustrated in the flow diagram FIG. 3. The starting point for FIG. 3 is illustrated as step 60. In step 60, a client application initiates a query. The term "query" in this step and throughout this specification should be interpreted as the term "query" is known in the art. Thus, a query may be a pure request for a result set of data, it may be a request for data other than database data, i.e. metadata or other data, or a query may simply be some other statement or instruction to the server.

Following the client initiated query, the client will issue an SQL command to open a cursor as illustrated in step 61. At this point, the cursor router 35 of FIG. 2 is invoked. As illustrated in decisional 62 of FIG. 3, the client must determine whether the server has the capability to generate and maintain the cursor data structure. As noted above, the client will make this determination by querying the server as to its status. The server 50 may return a status which specifically indicates that it has cursor capability or the server 50 may simply return a version number of the SQL Server. In the latter case, if the version number is greater than version 6.0 for Microsoft's® SQL, the client 30 accepts that the server 50 has cursor capabilities. After the server has returned its cursor capability status to client 30, the router 35 passes the cursor request to an appropriate client or server cursor module.

If the server 50 does not have cursor capabilities, the cursor router 35 will pass the cursor request to the client cursor module 34 so that the client can thereafter continue with its query. This process is illustrated as steps 63 and 66 in FIG. 3.

On the other hand, if the server does have cursor capabilities, the router 35 transfers responsibility of the cursor to the cursor module 54 of the server 50. To accomplish this transfer, the client 30 utilizes an RPC to pass the request to the server. Thus, if the server 50 has cursor capabilities, the router 35 of FIG. 2 recasts the original SQL statement as an RPC understood by the server and transmits the RPC to the server as indicated in step 64. Finally, the cursor is implemented at the server, step 65, and the client query is thereafter continued as shown in step 66.

It is noted that database cursors with locking operations, such as those described below, are not typically possible in the prior art without significant changes to the server's search engine, the client's DB-Library, and other aspects of the client/server database environment. Thus, the use of RPCs and existing database components is a particularly elegant solution which satisfies a need for enhanced database cursor operations.

Turning back to FIG. 2, if server 50 has a cursor module 54, router 35 routes all cursor requests to the server 50 via the network with the aid of DB-Library 33, operating system 32, and network interface 31 components and thus bypassing cursor module 34. After the RPC is transmitted, the server 50 assumes responsibility for generating and maintaining the cursor.

The RPC that is transmitted over the network by the client is received by the client interface 53 of server 50 via the server network interface 51 and the server operating system 52. Upon receipt of the data packets, the client interface 53 reconstructs the data packets and parses the RPC. Thereafter, the client interface transfers operation of the SQL Server to the appropriate procedure. In the case of the cursor RPC, the client interface transfers control of the server to the server cursor module 54.

Server cursor module 54 provides a mechanism to isolate or lock data from changes. Concurrency/data isolation in the present invention is improved over the prior art. This improvement results, in part, from the cursor module 54 being located at the server 50. By being located at the same physical or logical site as the database, the cursor module 54 can independently monitor and restrict clients' attempts to access data.

The functional advantages of a server based cursor module over a client based cursor module may be demonstrated with an example. Client 30 opens a database cursor through cursor module 54 at server 50, requesting a certain isolation level over the data accessed by this cursor. Thereafter, if another client, such as client 40, attempts to modify the same data locked by client 30, cursor module 54 will receive the attempt to modify. Depending on the lock or isolation granted to client 30, cursor module 54 may permit or deny access to the other client. By being located at the server 50, cursor module 54 has the ability to evaluate each request to modify data against each lock placed on that data by all other clients.

This example is contrasted with the prior art client based cursor module data isolation. In the prior art, the client isolates or locks data at the server by issuing fictional updates and withholding a commit instruction to release the lock until the cursor moved from the data. This process of locking data at the server through fictional updates was utilized since a cursor module at a client is unaware of requests by other clients to modify data at the server. Thus, the client based cursor does not compare requested access for data against locks presently held by other clients, but instead blindly locks the data when any type of isolation is required.

A preferred embodiment of cursor module 54 at server 50 is implemented in SQL Server in the following manner. Upon receipt of a request to open a cursor from a client, cursor module 54 generates a separate data structure that includes an identification of one of three different concurrency options and one of two different lock or data isolation options as specified by the client in its cursor RPC. The concurrency options may be indicated as "static", "keyset", and "dynamic," while the lock options may be indicated as "serializable" and "non-serializable". Although there are only three concurrency options and two isolation options in the described preferred embodiment, other combinations and options may be utilized.

The data structure generated by cursor module 54 at the request of the client therefore controls (1) the transmission to the client of updates to data as indicated by the client specified concurrency level and (2) the ability of other clients to modify data indicated by a particular client's cursor.

Turning to the first level of concurrency, static concurrency, it is noted that this option of the preferred embodiment guarantees that the result set is fixed in both membership and ordering as of the time that the result set was first generated. Thus, the client that initiated the query (the "cursor owner") will not see any changes to the result set that are made by other clients. In effect, the static concurrency option is a snapshot of the data that is not modifiable by the cursor owner or by any clients. A client request for static concurrency also represents a request for full data isolation.

The next concurrency option, keyset concurrency, also guarantees that the result set is fixed in both membership and ordering at the time that it is generated. In this sense, keyset concurrency is similar to static concurrency. Keyset differs from static, however, because the data isolation level is variable.

Finally, the last concurrency option of a preferred embodiment, dynamic concurrency, is a level in which all changes are visible to the cursor owner including membership and ordering changes. Dynamic concurrency requires the server to continually fetch the result set from a search plan and to transmit the results to the client.

Although these three options provide a client with various options over cursor concurrency, this list is not exhaustive. Indeed, the invention may also be practiced by utilizing various other concurrency options. For example, a concurrency option may be provided that permits a client cursor owner to view ordering changes but not membership changes. Or, alternatively, a concurrency option may be provided that permits a client cursor owner to view only additions or deletions to membership but not to ordering. Thus, additional concurrency options not listed within this specification may be specified that, nevertheless, fall within the scope of the invention.

Turning to the data isolation levels implemented in a preferred embodiment, it is noted that the cursor module will build a data structure that, in addition to reflecting concurrency, reflects two isolation level options: serializable and non-serializable. The serializable data isolation level is a level that restricts clients, other than the cursor owner, from making select changes to the data indicated by the cursor. In contrast, the non-serializable data isolation level permits changes without restriction.

FIG. 4 is a tabular illustration of the cursor options of the described preferred embodiment. More particularly, this figure indicates the correlation between cursor concurrency, data isolation level, and whether changes made to the data are visible or not visible to the client. The specific types of changes to the data are indicated at column 70. These changes are generally grouped into a cursor owner's changes and non-cursor owner changes. The changes include update, delete and insert operations as well as direct and indirect effects of changes to data.

Direct effect of changes made by other users includes those changes which directly effect membership in an open cursor. For example, consider the situation where a user has a cursor open on all employees with a salary greater than $50,000. If a second user alters the salary of an employee from 45,000 to 55,000, the employee, who at first did not qualify for membership in the cursor, does qualify now. This change represents a direct effect which, if visible, would appear in the cursor result set.

Indirect effect of changes by other users includes those changes which effect the qualification criteria of a cursor. For example, consider the situation where a user has a cursor open on all employees in department "x" whose salary is greater than the company average. If a second user changes the salary of an employee who is not in department "x," the membership in the cursor is not directly effected. However, since the change effects the company average, the qualification criteria changes and the membership in the cursor may be indirectly effected. Again, the change will appear in the cursor result set only if such changes are visible, depending upon the concurrency and isolation options chosen, as shown in FIG. 4.

The client, therefore, specifies a cursor with a desired concurrency and a data isolation level in an RPC submitted to the server. From this information, a cursor module at a server, such as module 54 at server 50, generates an appropriate data structure.

Figure 5:
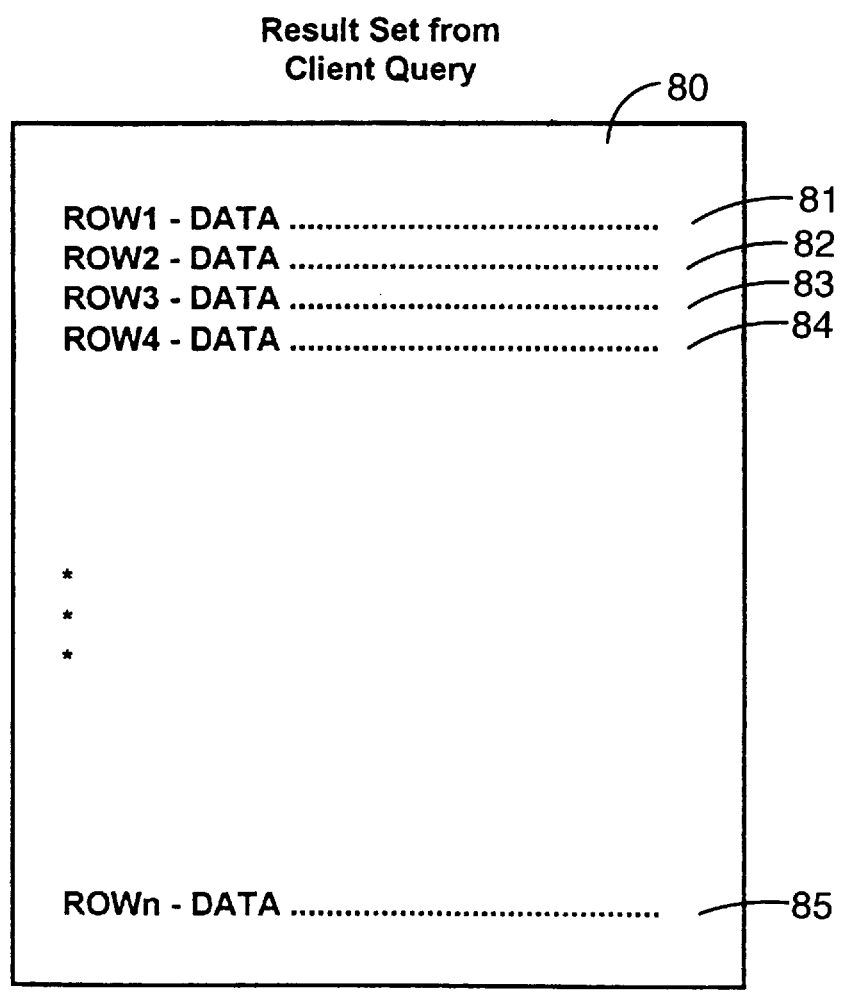
FIG. 5 is an illustrative diagram of a result set.

FIG. 5 shows an example keyset result set that is generated by an SQL Server via a client-initiated query. Result set 80 is illustrated as a series of rows of data, i.e. rows 81–84 and 85.

The described preferred embodiment uses two main data structures to implement cursors in the database engine at the server: 1) a cursor data structure, used for each cursor, and 2) a cursor table ("crstabl") structure, used for each table used in a particular cursor. At the server, the above cursor structures for a particular user are chained together off the user's main context structure (PSS). The crstabl structures for a particular cursor are linked in a chain off the parent cursor. The type definitions for the parameters of the cursor structure and cursor table structure are set forth in FIGS. 6 and 7, respectively.

The cursor data structure contains information about the particular cursor, including information such as the cursor scroll option (keyset, dynamic, etc. . . . ), concurrency control, current position within the results set, and the number of rows to be fetched. It also contains pointers to execution data structures such as E_STMTs for the cursor select and the cursor fetch, a pointer to the current buffered row, and 3 separate lock lists. The lock lists facilitate releasing locks obtained for different purposes at the appropriate time. For example, locks obtained to protect the fetch are released when the fetch completes; locks taken to protect the scroll buffer are released when the scroll-window moves; and locks taken to guarantee serializable isolation level are held until commit.

The crstable structure contains information about a particular table used in the cursor such as information about the table's index, a pointer to the table's session descriptor (SDES), and information that differs depending on the cursor type (keyset, dynamic, etc. . . . ). For a keyset cursor, it contains a pointer to the keyset work SDES and a row template for keyset fetch. For dynamic cursor, it contains the search arguments (SARGS) for the dynamic fetch.

When an incoming remote procedure call is recognized to be a cursor open operation, cursor module 54 extracts the select statement and a parse/normalize/compile mechanism is invoked to produce an E_STMT tree. Instead of simply executing the E_STMT as in the case of a non-cursor operation, the cursor module 54 saves a pointer to the E_STMT in a cursor data structure. Depending on the type of cursor, the E_STMT is then modified slightly.

In the case of a keyset cursor, the E_STMT is modified to return the results of the request directly to a work table at the server, instead of to the user. The column list is also changed to include only the key columns and a row number. The selection criteria and orderby clause, however, remain intact. The modified E_STMT is then executed by calling the existing sequencer routine which produces the keyset worktable. A fetch E_STMT is also constructed and saved. The fetch E_STMT has the same column list from the original select statement; however, the selection criteria is modified so that the keyset worktable is used as an index to the original tables. Since the keyset worktable will provide ordering of the result set, the ordering criteria of the E_STMT is removed and not used.

When an incoming remote procedure call is recognized to be a cursor fetch-next or fetch-previous operation, the row number of the next row is computed by the cursor module 54 referring to the cursor structure and adding or subtracting the number of rows previously fetched to or from the current row number. Since the keyset worktable has a unique index to row number, the keyset row corresponding to the desired data row can be located directly. The SARGs of the fetch E_STMT are then modified to point into the keyset row and the E_STMT is executed, which causes the data row corresponding to the keyset row to be fetched and sent to the requesting client.

If multiple row fetches are required, the above procedure is repeated until the specified number of rows have been fetched. For efficiency reasons, i.e. to reduce network packet transmission overhead, the multiple rows are sent to the client in a batch and the client may specify the number of rows sent in each batch. Moreover, the client can dynamically change the number of rows on each fetch.

To improve performance, the keyset table includes the physical page-number/row-number of the corresponding data row. The data row is first fetched via this page-number/row-number. If the data row located has the expected key values, then that data row is returned as the result. Otherwise, the data row is fetched by using the SARG as described above.

For the keyset cursor, client requests that result in table "joins" are handled by saving the unique index of each component table. Fetching a cursor row simply consists of fetching a row from each component table using the saved keys. Updating a table is similar except only a single component table is involved.

If an original select contains an aggregate (e.g. sum, average, etc. . . . ), then the cursor type reverts to "insensitive." An insensitive cursor is similar to a keyset cursor, except the entire results set is copied to the worktable, instead of only the keys. Thereafter, all fetches can be performed using the copied results set.

In the described preferred embodiment, both keyset and insensitive cursors support fetch relative and fetch absolute. For fetch absolute, the specified row number becomes the new row number. For fetch relative, the specified delta is applied to the current row number. Since the keyset worktable is indexed by row number, the operation is as efficient as for fetch-next or fetch-previous commands.

Unlike the case for a keyset cursor, the E_STMT from the original select statement of an insensitive cursor is not modified to add the key-columns. An index is then constructed on the row number and the fetch E_STMT is constructed to use the worktable rather than the original table. However, the select list as the user originally specifies is not changed.

In the case of a dynamic cursor, the E_STMT is modified to include the unique keys; the column list, source tables, and destination are left intact. Moreover, the E_STMT is not executed at the time the cursor is opened. Instead, the E_STMT is executed on each fetch operation. The SARGs are modified before each fetch so that the scan begins at the required row. To facilitate fetch-next and fetch-previous operations, the first and last key values in the fetch buffer are saved after each fetch operation. For fetch-next, the key value of the last row fetched is inserted into the SARG and the operation is set to greater-than so that the first row with key value greater than the last row is fetched. For fetch-previous, the key value of the first row in the fetch buffer is similarly inserted into the SARG and the operation is set to less-than.

Since these dynamic fetches are supported by an index, the existing scan mechanism finds the correct row with very little overhead by simply following the index either forward or backward. The fetching of rows is stopped when the requested number of rows has been fetched. As with the keyset technique, the rows are sent to the client in a batch and the number of rows per batch may be changed dynamically. Fetch relative is supported by skipping the specified number of rows in the specified direction.

Backward scan in a dynamic cursor, i.e. fetch previous or fetch relative to a negative number, causes the desired rows to be retrieved in the inverse order, i.e. last desired row fetched first. This set of rows is buffered at the server and then sent to the client in the correct order.

In the described preferred embodiment, dynamic cursors do not support fetch absolute like keyset cursors because there is no keyset table indexed by row number. Orderby clauses are also not supported by dynamic cursors unless the ordering either matches an existing index or does not cause an explicit sort.

"Joins" are automatically handled in the dynamic cursor because the original query is reexecuted with additional SARGs to restrict the operable rows to the desired fetch buffer. Table updates are handled in a similar way.

As can be seen from the foregoing detailed description, there is provided a method and system for implementing database cursors in a client/server environment. The present invention is compatible with existing client/server database search engines but provides for increased control over cursor lock options, an ability to share cursors and search plans across multiple nodes in a network, and an increase in the overall operating efficiency of a database application.

The present invention provides efficient full scrolling of a client's position in a result set including result sets generated from complex queries and spanning multiple tables. By providing full control over scrolling and locking options, the invention provides an application designer to optimize an application based on a desired level of data concurrency and/or data isolation. Additionally, the invention efficiently permits multiple rows to be fetched with a single operation, permits these rows to be returned to a client in a batch size specified by the client, and also permits the client to resize the batch while the cursor is open at the server.

Although the foregoing detailed description of a preferred embodiment is concentrated on a description of the invention, it is not intended to limit the invention to operation solely within said specific environment. Rather, the invention and the principles herein disclosed may have broad applicability as can be appreciated by those skilled in the art.

What is claimed is:

1. A database management system of the type which may be executed by a server computer having a database and a network interface module operating in a client/server network environment, comprising:

a client interface operable to parse a communication packet received from a client on the network through the network interface module, said communication packet containing a client database request;

a search engine module including a query optimizer operable to select an optimum process for searching the database, said search engine module also operable to produce an execution plan of instructions on how to search the database to produce a result set;

data manager and kernel components responsive to said instructions from the search engine and operable to access data in the database in accordance with said instructions to process the client database request;

a sequencer operable to receive the client database request from the client interface and to invoke the search engine and data manager in the proper sequence to perform the database request; and a cursor module operable to receive a cursor request from a client through said network interface, generate data structures representative of said client's position within the result set, and maintain said data structures on said server.

2. A client computer in a database management system of the type which may be executed by client and server computers, comprising:

a client application operable to provide database commands in the form of data structures;

a cursor router positioned on said client computer and operable to intercept command data structures from said client application and to route said command data structures representing requests for database cursors; and a cursor module operable to receive a cursor request from a client application through said cursor router, generate data structures representative of said client's position within the result set, and maintain said data structures on said client.

3. A network database system including database cursors comprising:

at least one client computer including a database client application, an operating system, and a network interface;

at least one server computer including a database management system, an operating system, a server cursor module and a network interface;

a network connecting said at least one client computer to said at least one server;

a cursor router positioned on said client computer, said cursor router further comprising an intercepting means for intercepting data representing requests for cursors, an evaluating means for generating a router signal representative of whether a cursor module is present on said server, a routing means for routing cursor requests to a client cursor module or to a server cursor module depending on the presence of said router signal;

said cursor module on said client computer receiving cursor requests, generating data structures representative of said client application's position within a set of data, and storing said data structures on said client;

said cursor module on said server computer receiving cursor requests through said network, generating data structures representative of said client application's position within a set of data, and storing said data structures on said server.

* * * * *

UNITED STATES PATENT AND TRADEMARK OFFICE
CERTIFICATE OF CORRECTION

PATENT NO. : 5,835,904
DATED : November 10, 1998
INVENTOR(S) : Frederic O. Vicik and Lale R. Divringi It is certified that error appears in the above-identified patent and that said Letters Patent is hereby corrected as shown below:

In Column 5, line 14: "ultimately;" should read --ultimately,--.
In Column 8, line 13: "Token Rings" should read --Token Ring--.

Signed and Sealed this

Sixth Day of July, 1999

Attest:

Q. TODD DICKINSON

Attesting Officer        Acting Commissioner of Patents and Trademarks